(12) United States Patent
Ye et al.

(10) Patent No.: US 12,613,801 B2
(45) Date of Patent: Apr. 28, 2026

(54) INCREMENTAL REFERENCE COUNTING VALIDATION BASED ON A COPY-ON-WRITE INDEXING STRUCTURE

(71) Applicant: Dell Products L.P., Round Rock, TX (US)

(72) Inventors: Yi Ye, Shanghai (CN); Kalyan C. Gunda, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/768,376

(22) Filed: Jul. 10, 2024

(65) Prior Publication Data

US 2026/0017191 A1    Jan. 15, 2026

(51) Int. Cl.
　　*G06F 12/02*　　(2006.01)
　　*G06F 16/22*　　(2019.01)
(52) U.S. Cl.
　　CPC ...... *G06F 12/0253* (2013.01); *G06F 16/2246* (2019.01); *G06F 2212/7205* (2013.01)
(58) Field of Classification Search
　　CPC ............. G06F 12/0253; G06F 16/2246; G06F 2212/7205
　　See application file for complete search history.

(56) References Cited

U.S. PATENT DOCUMENTS

| | | | | |
|---|---|---|---|---|
| 10,698,808 | B2 * | 6/2020 | Pandurangan | ........ G06F 3/0652 |
| 11,604,729 | B2 * | 3/2023 | Pressler | ............. G06F 12/0276 |
| 2020/0142904 | A1 * | 5/2020 | Chen | ....................... G06F 16/27 |
| 2020/0174668 | A1 * | 6/2020 | Byun | .................... G06F 3/0604 |
| 2020/0257621 | A1 * | 8/2020 | Pletka | ................ G06F 12/0253 |
| 2020/0356301 | A1 * | 11/2020 | Danilov | ............... G06F 3/0608 |
| 2022/0382674 | A1 * | 12/2022 | Wang | .................... G06F 16/245 |
| 2022/0398172 | A1 * | 12/2022 | Subramanian | ...... G06F 12/0824 |
| 2023/0057577 | A1 * | 2/2023 | De La Cerda | ...... G06F 12/0246 |
| 2025/0103486 | A1 * | 3/2025 | Kim | .................... G06F 12/0246 |

* cited by examiner

*Primary Examiner* — Huawen A Peng
(74) *Attorney, Agent, or Firm* — Amin, Turocy & Watson, LLP

(57) ABSTRACT

A system can maintain a copy-on-write b+ tree for a data storage system that is configured to store data as chunks, and a mapping between tree page identifiers of the b+ tree and first in-use chunk identifiers. The system can perform reference count validation, comprising iterating over the mapping, wherein the iterating over the mapping comprises, based on a first tree page identifier of the tree page identifiers being present in the mapping, loading second in-use chunk identifiers that correspond to the first tree page identifier directly from the mapping; and based on the first tree page identifier of the tree page identifiers being absent, loading corresponding content, extracting third in-use chunk identifiers from object metadata of the content, and updating the mapping based on the third in-use chunk identifiers, to produce an updated mapping. The system can perform garbage collection of the data storage system based on the validation.

20 Claims, 12 Drawing Sheets

100

REMOTE COMPUTER 106

COMMUNICATIONS NETWORK 104

COMPUTER STORAGE SYSTEM 102

INCREMENTAL REFERENCE COUNTING VALIDATION BASED ON A COPY-ON-WRITE INDEXING STRUCTURE COMPONENT 108

DATA STORAGE 110

B+ TREE 112

MAPPING 114

200
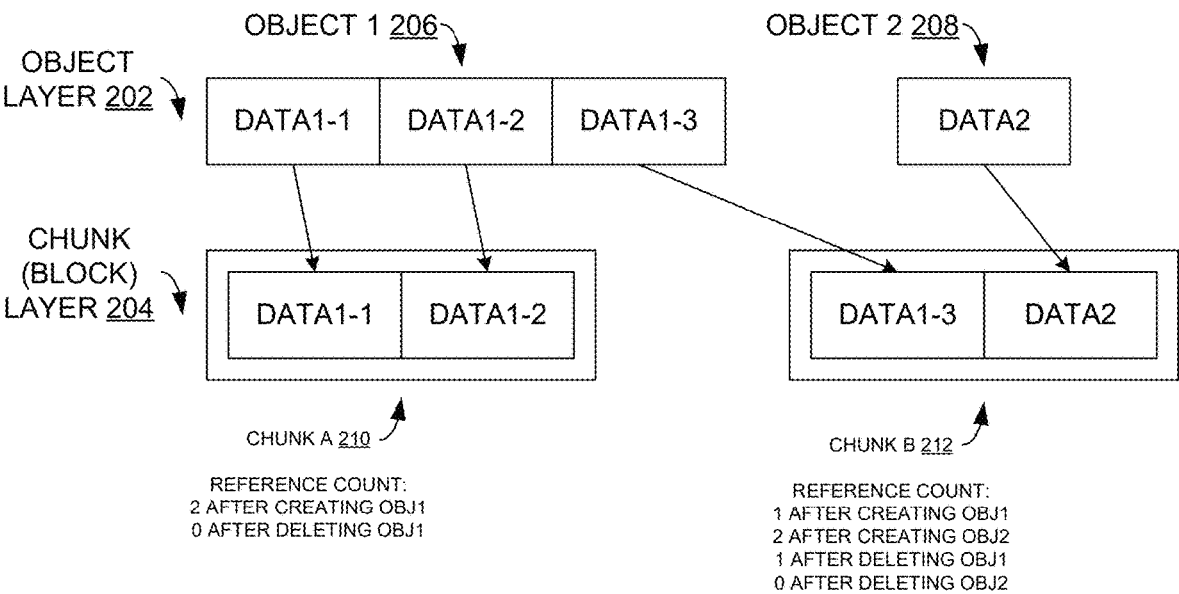
INCREMENTAL REFERENCE COUNTING
VALIDATION BASED ON A COPY-ON-WRITE
INDEXING STRUCTURE COMPONENT 214
OBJECT 1 206
OBJECT 2 208
OBJECT
LAYER 202
| DATA1-1 | DATA1-2 | DATA1-3 |
|---------|---------|---------|
| DATA2 |
|-------|
CHUNK
(BLOCK)
LAYER 204
| DATA1-1 | DATA1-2 |
|---------|---------|
| DATA1-3 | DATA2 |
|---------|-------|
CHUNK A 210
CHUNK B 212
REFERENCE COUNT:
2 AFTER CREATING OBJ1
0 AFTER DELETING OBJ1
REFERENCE COUNT:
1 AFTER CREATING OBJ1
2 AFTER CREATING OBJ2
1 AFTER DELETING OBJ1
0 AFTER DELETING OBJ2
FIG. 2

300

INCREMENTAL REFERENCE COUNTING
VALIDATION BASED ON A COPY-ON-WRITE
INDEXING STRUCTURE COMPONENT 312

B+ TREE 308

ROOT

CREATE
—OBJECT 1
302

INDEX
PAGE A

INDEX
PAGE B

UPDATE BTREE FOR
OBJECT1

LEAF
PAGE C

LEAF
PAGE D

LEAF
PAGE E

LEAF
PAGE F

LEAF
PAGE G

WRITE-
AHEAD-
LOG 304

FOR B+ TREE FAILURE
RECOVERY

OBJECT 1 METADATA 310

CREATE
OBJECT1
 DATAINDEX {
  OBJECTOFFSET
  OBJECT LENGTH
 }
 DATALOCATION {
  CHUNK A
  OFFSET
  ENDOFFSET
 }
 ...
}

CHUNK A
306 (FOR
OBJECT 1
DATA)

FIG. 3

400

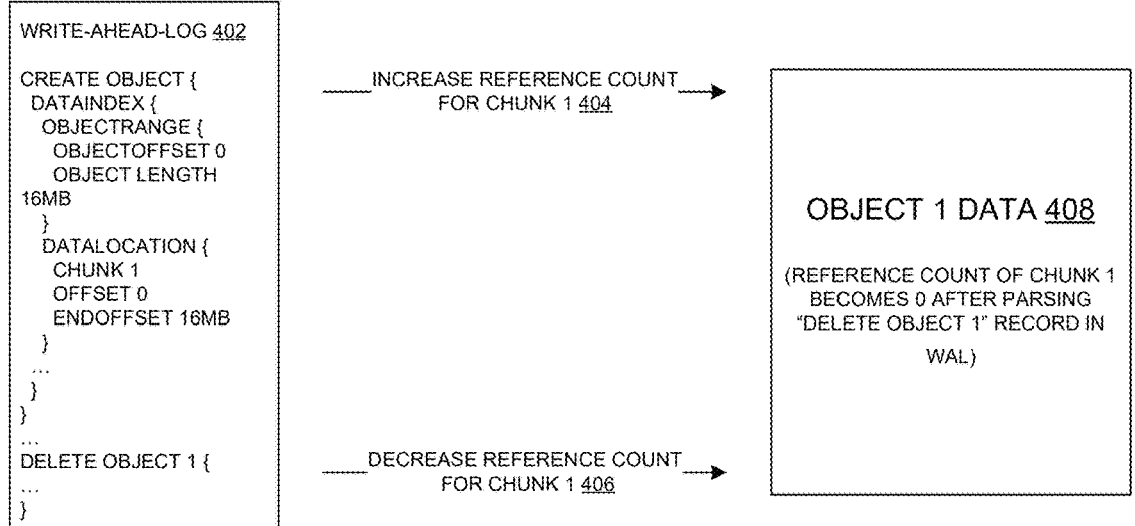

INCREMENTAL REFERENCE COUNTING
VALIDATION BASED ON A COPY-ON-WRITE
INDEXING STRUCTURE COMPONENT 410

WRITE-AHEAD-LOG 402

CREATE OBJECT {
  DATAINDEX {
    OBJECTRANGE {
      OBJECTOFFSET 0
      OBJECT LENGTH
16MB
    }
    DATALOCATION {
      CHUNK 1
      OFFSET 0
      ENDOFFSET 16MB
    }
    ...
  }
}
...
DELETE OBJECT 1 {
...
}

INCREASE REFERENCE COUNT
FOR CHUNK 1 404

DECREASE REFERENCE COUNT
FOR CHUNK 1 406

OBJECT 1 DATA 408

(REFERENCE COUNT OF CHUNK 1
BECOMES 0 AFTER PARSING
"DELETE OBJECT 1" RECORD IN
WAL)

FIG. 4

500

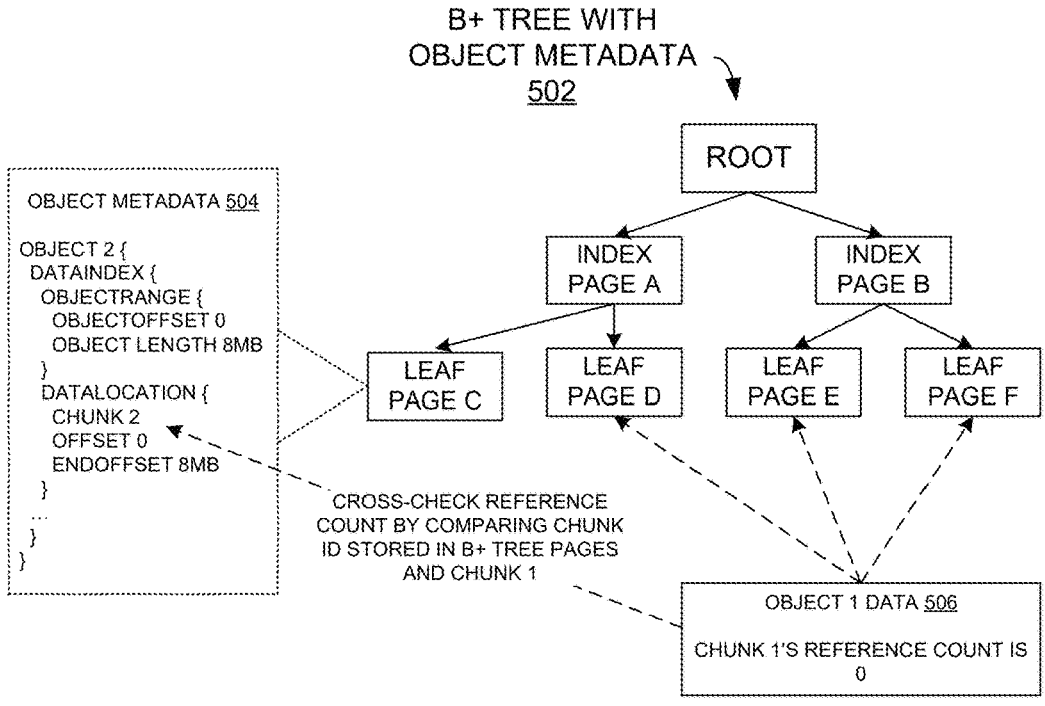

INCREMENTAL REFERENCE COUNTING
VALIDATION BASED ON A COPY-ON-WRITE
INDEXING STRUCTURE COMPONENT 508

B+ TREE WITH
OBJECT METADATA
502

ROOT

OBJECT METADATA 504

OBJECT 2 {
 DATAINDEX {
  OBJECTRANGE {
   OBJECTOFFSET 0
   OBJECT LENGTH 8MB
  }
  DATALOCATION {
   CHUNK 2
   OFFSET 0
   ENDOFFSET 8MB
  }
  ...
 }
}

INDEX
PAGE A

INDEX
PAGE B

LEAF
PAGE C

LEAF
PAGE D

LEAF
PAGE E

LEAF
PAGE F

CROSS-CHECK REFERENCE
COUNT BY COMPARING CHUNK
ID STORED IN B+ TREE PAGES
AND CHUNK 1

OBJECT 1 DATA 506

CHUNK 1'S REFERENCE COUNT IS
0

FIG. 5

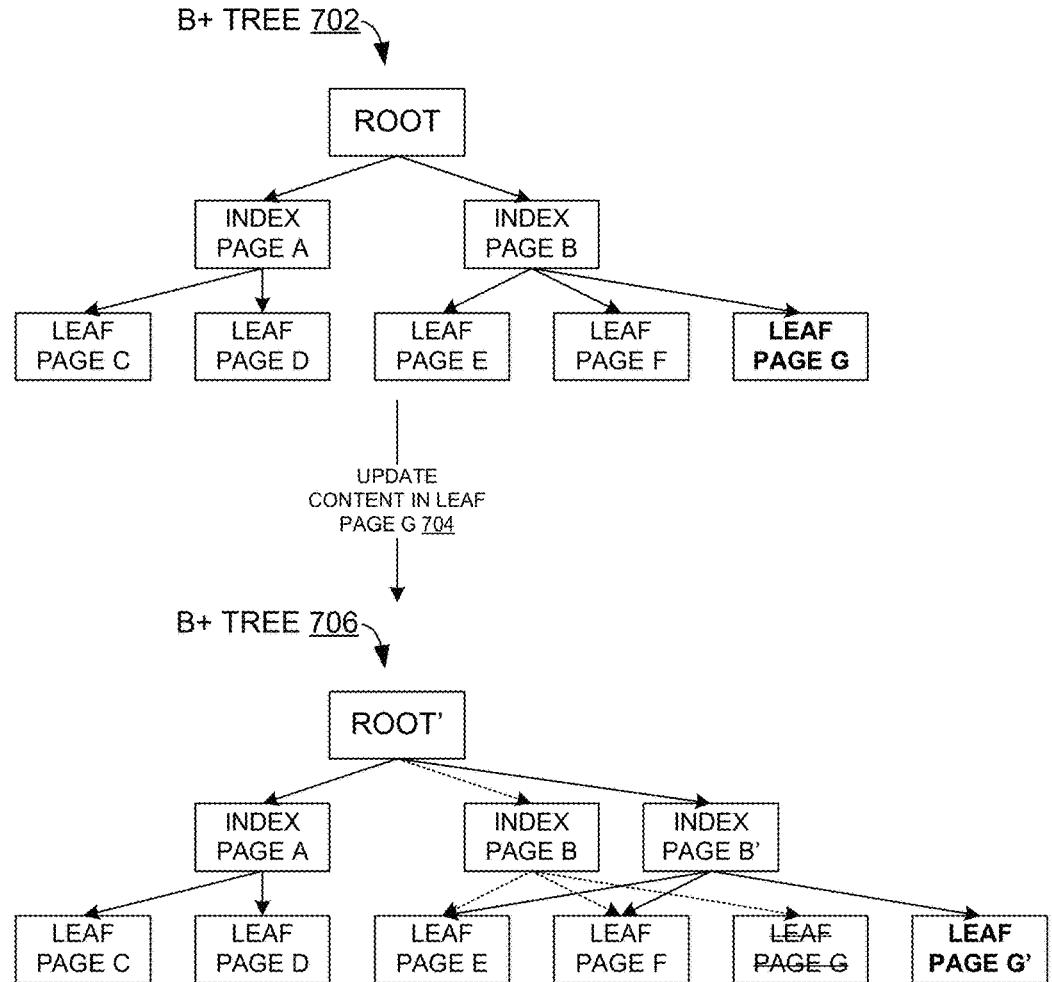
FIG. 7

900

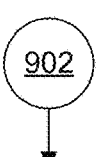

902

MAINTAINING A COPY-ON-WRITE B+ TREE FOR A DATA STORAGE SYSTEM THAT IS CONFIGURED TO STORE DATA AS CHUNKS 904

MAINTAINING A MAPPING BETWEEN TREE PAGE IDENTIFIERS OF THE B+ TREE AND FIRST IN-USE CHUNK IDENTIFIERS, OF THE DATA STORAGE SYSTEM, THAT ARE USED TO STORE DATA 906

PERFORMING A REFERENCE COUNT VALIDATION, COMPRISING ITERATING OVER THE MAPPING, TO PRODUCE A VALIDATION RESULT, WHEREIN THE ITERATING OVER THE MAPPING COMPRISES, BASED ON A FIRST TREE PAGE IDENTIFIER OF THE TREE PAGE IDENTIFIERS BEING PRESENT IN THE MAPPING, LOADING SECOND IN-USE CHUNK IDENTIFIERS THAT CORRESPOND TO THE FIRST TREE PAGE IDENTIFIER DIRECTLY FROM THE MAPPING; AND BASED ON THE FIRST TREE PAGE IDENTIFIER OF THE TREE PAGE IDENTIFIERS BEING ABSENT FROM THE MAPPING, LOADING CONTENT THAT CORRESPONDS TO THE FIRST TREE PAGE IDENTIFIER, EXTRACTING THIRD IN-USE CHUNK IDENTIFIERS FROM OBJECT METADATA OF THE CONTENT, AND UPDATING THE MAPPING BASED ON THE THIRD IN-USE CHUNK IDENTIFIERS, TO PRODUCE AN UPDATED MAPPING 908

PERFORMING GARBAGE COLLECTION OF THE DATA STORAGE SYSTEM BASED ON THE VALIDATION RESULT 910

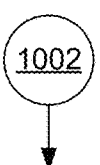

1002

MAINTAINING A MAPPING BETWEEN TREE PAGE IDENTIFIERS OF A COPY-ON-WRITE B+ TREE AND FIRST IN-USE CHUNK IDENTIFIERS OF A STORAGE SYSTEM THAT ARE USED TO STORE DATA 1004

PERFORMING A REFERENCE COUNT VALIDATION, COMPRISING ITERATING OVER THE MAPPING, TO PRODUCE A VALIDATION RESULT, WHEREIN THE ITERATING OVER THE MAPPING COMPRISES, BASED ON A FIRST TREE PAGE IDENTIFIER OF THE TREE PAGE IDENTIFIERS BEING PRESENT IN THE MAPPING, LOADING, BY THE SYSTEM AND FROM THE MAPPING, SECOND IN-USE CHUNK IDENTIFIERS THAT CORRESPOND TO THE FIRST TREE PAGE IDENTIFIER; AND BASED ON THE FIRST TREE PAGE IDENTIFIER BEING OMITTED FROM THE MAPPING, LOADING CONTENT THAT CORRESPONDS TO THE FIRST TREE PAGE IDENTIFIER, AND UPDATING THE MAPPING BASED ON THIRD IN-USE CHUNK IDENTIFIERS FROM OBJECT METADATA OF THE CONTENT THAT CORRESPONDS TO THE FIRST TREE PAGE IDENTIFIER, TO PRODUCE AN UPDATED MAPPING 1006

PERFORMING GARBAGE COLLECTION OF THE STORAGE SYSTEM BASED ON THE VALIDATION RESULT 1008

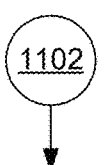

PERFORMING A REFERENCE COUNT VALIDATION, COMPRISING ITERATING OVER A MAPPING BETWEEN TREE PAGE IDENTIFIERS OF A COPY-ON-WRITE B+ TREE AND FIRST IN-USE CHUNK IDENTIFIERS OF A STORAGE SYSTEM THAT ARE USED TO STORE DATA, TO PRODUCE A VALIDATION RESULT, WHEREIN THE ITERATING OVER THE MAPPING COMPRISES, BASED ON A FIRST TREE PAGE IDENTIFIER OF THE TREE PAGE IDENTIFIERS BEING PRESENT IN THE MAPPING, LOADING, BY THE SYSTEM AND FROM THE MAPPING, SECOND IN-USE CHUNK IDENTIFIERS THAT CORRESPOND TO THE FIRST TREE PAGE IDENTIFIER; AND BASED ON THE FIRST TREE PAGE IDENTIFIER BEING OMITTED FROM THE MAPPING, LOADING CONTENT THAT CORRESPONDS TO THE FIRST TREE PAGE IDENTIFIER, AND UPDATING THE MAPPING BASED ON THIRD IN-USE CHUNK IDENTIFIERS FROM OBJECT METADATA OF THE CONTENT THAT CORRESPONDS TO THE FIRST TREE PAGE IDENTIFIER, TO PRODUCE AN UPDATED MAPPING 1104

PERFORMING GARBAGE COLLECTION OF THE STORAGE SYSTEM BASED ON THE VALIDATION RESULT 1106

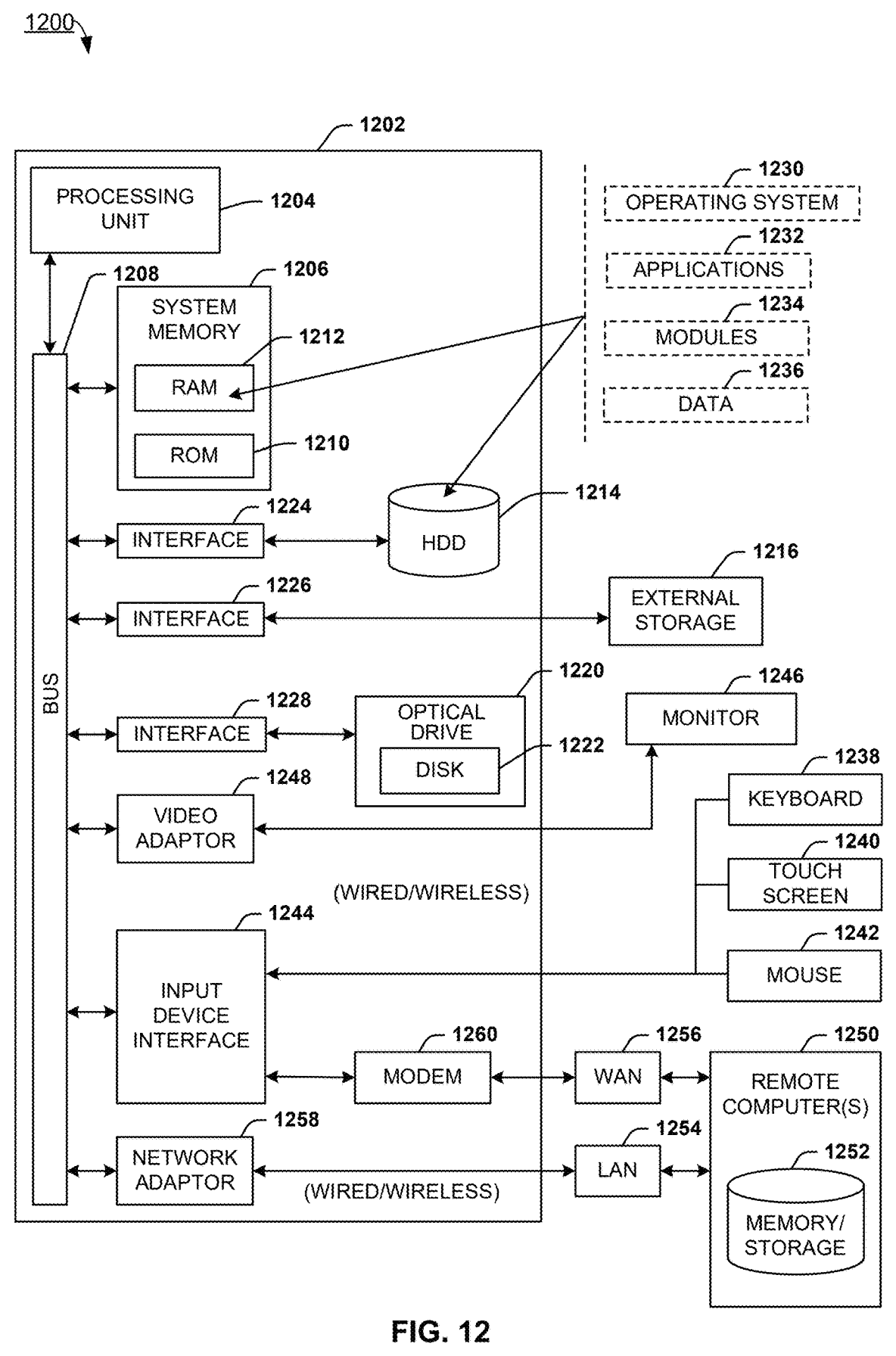

PROCESSING UNIT — 1204

1208   1206
SYSTEM MEMORY

1212
RAM

1210
ROM

OPERATING SYSTEM — 1230

APPLICATIONS — 1232

MODULES — 1234

DATA — 1236

INTERFACE — 1224

HDD — 1214

INTERFACE — 1226

EXTERNAL STORAGE — 1216

INTERFACE — 1228

OPTICAL DRIVE — 1220

DISK — 1222

MONITOR — 1246

VIDEO ADAPTOR — 1248

(WIRED/WIRELESS)

KEYBOARD — 1238

TOUCH SCREEN — 1240

MOUSE — 1242

INPUT DEVICE INTERFACE — 1244

MODEM — 1260

WAN — 1256

REMOTE COMPUTER(S) — 1250

NETWORK ADAPTOR — 1258

LAN — 1254

(WIRED/WIRELESS)

MEMORY/ STORAGE — 1252

BUS

FIG. 12

INCREMENTAL REFERENCE COUNTING VALIDATION BASED ON A COPY-ON-WRITE INDEXING STRUCTURE

BACKGROUND

Computers can store data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain a copy-on-write b+ tree for a data storage system that is configured to store data as chunks. The system can maintain a mapping between tree page identifiers of the b+ tree and first in-use chunk identifiers, of the data storage system, that are used to store data. The system can perform a reference count validation, comprising iterating over the mapping, to produce a validation result, wherein the iterating over the mapping comprises, based on a first tree page identifier of the tree page identifiers being present in the mapping, loading second in-use chunk identifiers that correspond to the first tree page identifier directly from the mapping; and based on the first tree page identifier of the tree page identifiers being absent from the mapping, loading content that corresponds to the first tree page identifier, extracting third in-use chunk identifiers from object metadata of the content, and updating the mapping based on the third in-use chunk identifiers, to produce an updated mapping. The system can perform garbage collection of the data storage system based on the validation result.

An example method can comprise maintaining, by a system comprising at least one processor, a mapping between tree page identifiers of a copy-on-write b+ tree and first in-use chunk identifiers of a storage system that are used to store data. The method can further comprise performing, by the system, a reference count validation, comprising iterating over the mapping, to produce a validation result, wherein the iterating over the mapping comprises, based on a first tree page identifier of the tree page identifiers being present in the mapping, loading, by the system and from the mapping, second in-use chunk identifiers that correspond to the first tree page identifier; and based on the first tree page identifier being omitted from the mapping, loading, by the system, content that corresponds to the first tree page identifier, and updating, by the system, the mapping based on third in-use chunk identifiers from object metadata of the content that corresponds to the first tree page identifier, to produce an updated mapping. The method can further comprise performing, by the system, garbage collection of the storage system based on the validation result.

An example non-transitory computer-readable medium can comprise instructions that, in response to execution, cause a system comprising a processor to perform operations. These operations can comprise performing a reference count validation, comprising iterating over a mapping between tree page identifiers of a copy-on-write b+ tree and first in-use chunk identifiers of a storage system that are used to store data, to produce a validation result, wherein the iterating over the mapping comprises, based on a first tree page identifier of the tree page identifiers being present in the mapping, loading, by the system and from the mapping, second in-use chunk identifiers that correspond to the first tree page identifier; and based on the first tree page identifier being omitted from the mapping, loading content that corresponds to the first tree page identifier, and updating the mapping based on third in-use chunk identifiers from object metadata of the content that corresponds to the first tree page identifier, to produce an updated mapping. These operations can further comprise performing garbage collection of the storage system based on the validation result.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 2 illustrates an example of a relationship between an object, a chunk, and chunk reference counting, and that can facilitate incremental reference counting validation based on a copy-on-write indexing structure, in accordance with an embodiment of this disclosure;

FIG. 3 illustrates an example of usage of a B+ tree and a write-ahead-log (WAL) for object data indexing and metadata storage, and that can facilitate incremental reference counting validation based on a copy-on-write indexing structure, in accordance with an embodiment of this disclosure;

FIG. 4 illustrates an example of parsing a write-ahead-log (WAL) to populate references for reference counting, and that can facilitate incremental reference counting validation based on a copy-on-write indexing structure, in accordance with an embodiment of this disclosure;

FIG. 5 illustrates an example of validating a reference counting result by iterating a B+ tree and cross-checking against an in-use chunk list in object metadata that is extracted from B+ tree pages, and that can facilitate incremental reference counting validation based on a copy-on-write indexing structure, in accordance with an embodiment of this disclosure;

FIG. 7 illustrates an example of a copy-on-write (CoW) B+ tree that can facilitate incremental reference counting validation based on a copy-on-write indexing structure, in accordance with an embodiment of this disclosure;

FIG. 9 illustrates an example process flow that can facilitate incremental reference counting validation based on a copy-on-write indexing structure, in accordance with an embodiment of this disclosure;

FIG. 10 illustrates another example process flow that can facilitate incremental reference counting validation based on a copy-on-write indexing structure, in accordance with an embodiment of this disclosure;

FIG. 11 illustrates another example process flow that can facilitate incremental reference counting validation based on a copy-on-write indexing structure, in accordance with an embodiment of this disclosure;

FIG. 12 illustrates an example block diagram of a computer operable to execute an embodiment of this disclosure.

DETAILED DESCRIPTION

Overview

In storage systems using reference counting-based garbage collection techniques, after reference counts of blocks/chunks become zero, an indexing structure with file/object metadata can be used as a source of truth to validate if there are any files/objects that still refer to these blocks/chunks before reclaiming them in case reference counting is wrong. This validation process can iterate the entire indexing structure, and extract file/object metadata from it to determine whether blocks/chunks to be reclaimed with reference count 0 are still used by any files/objects. A speed of the verification can be inversely proportional to a number of entries in the system (e.g., a number of objects in an object storage system). As a result, the garbage collection throughput and storage efficiency can be low on system with a large number of objects.

The present techniques can be implemented to facilitate an incremental reference counting validation process, which can be based on a copy-on-write indexing structure. Instead of loading contents of the entire indexing structure, the present techniques can involve loading only contents of changed parts of the indexing structure on demand to build and update an in-use chunk list incrementally for a validation process, to reduce an input/output (IO) overhead.

As a result, both IO overhead and time of the validation process can be reduced (e.g., to only about 1%) in a few rounds of a validation process. Garbage collection performance and storage efficiency can be improved, as a chunk reference count validation process can usually be a bottleneck of garbage collection on large-scale deployments. An overall system performance can also be improved because of less IO/central processing unit (CPU) overhead caused by the indexing structure content extraction.

Example Architectures, Etc.

Figure 1:
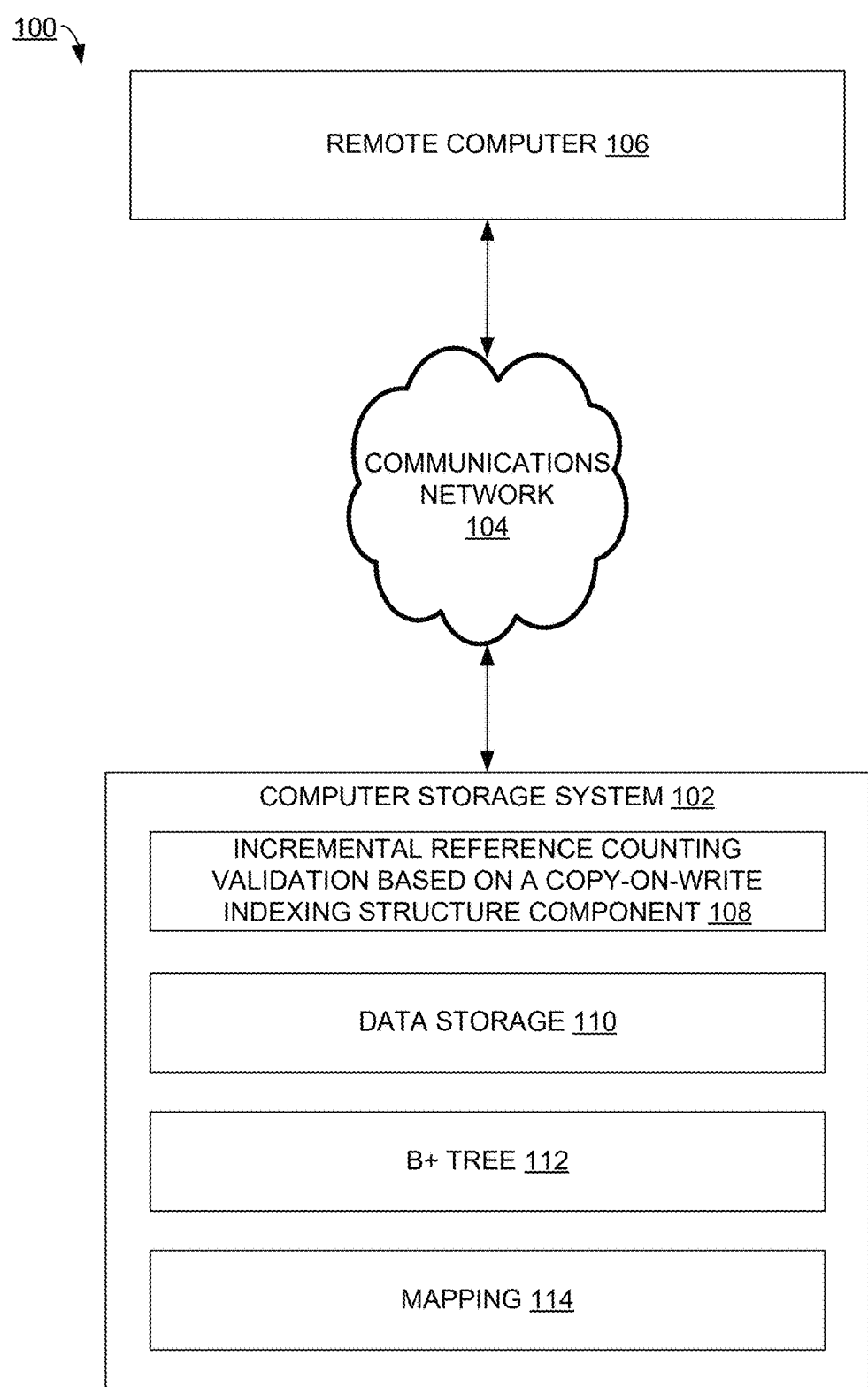
FIG. 1 illustrates an example system architecture that can facilitate incremental reference counting validation based on a copy-on-write indexing structure, in accordance with an embodiment of this disclosure.

FIG. 1 illustrates an example system architecture 100 that can facilitate incremental reference counting validation based on a copy-on-write indexing structure, in accordance with an embodiment of this disclosure.

System architecture 100 comprises computer storage system 102, communications network 104, and remote computer 106. In turn, computer storage system 102 comprises incremental reference counting validation based on a copy-on-write indexing structure component 108, data storage 110, B+ tree 112, and mapping 114.

Each of computer storage system 102 and/or remote computer 106 can be implemented with part(s) of computing environment 1200 of FIG. 12. Communications network 104 can comprise a computer communications network, such as the Internet, or an isolated private computer communications network.

Computer storage system 102 can store computer data in data storage 110. Data storage 110 can comprise a copy-on-write (CoW) data storage system, and can store data as chunks. This data of data storage 110 can be tracked via B+ tree 112. Mapping 114 can comprise a mapping between B+ tree page identifiers (IDs) and in-use chunk IDs for a reference count validation process. Mapping 114 can be incrementally updated as data is modified in data storage 110.

Where remote computer 106 accesses computer storage system 102 via communications network 104 to modify data of data storage 110, mapping 114 can be incrementally updated so that mapping 114 can be used in performing a reference count validation process, as described herein.

In some examples, incremental reference counting validation based on a copy-on-write indexing structure component 108 can implement part(s) of the process flows of FIGS. 9-11 to facilitate incremental reference counting validation based on a copy-on-write indexing structure.

It can be appreciated that system architecture 100 is one example system architecture for service call topic prediction, and that there can be other system architectures that facilitate incremental reference counting validation based on a copy-on-write indexing structure.

FIG. 2 illustrates an example 200 of a relationship between an object, a chunk, and chunk reference counting, and that can facilitate incremental reference counting validation based on a copy-on-write indexing structure, in accordance with an embodiment of this disclosure. In some examples, part(s) of example 200 can be implanted by part(s) of system architecture 100 of FIG. 1 to facilitate incremental reference counting validation based on a copy-on-write indexing structure.

Example 200 comprises object layer 202, chunk (block) layer 204, object 1 206, object 2 208, chunk A 210, chunk B 212, and incremental reference counting validation based on a copy-on-write indexing structure component 214 (which can be similar to incremental reference counting validation based on a copy-on-write indexing structure component 108 of FIG. 1).

There can be object storage systems that can share a design of storing object data in protected blocks called chunks. Object data can be written in chunks in append-only style. A chunk can contain data of several objects while an object's data can also be stored in different chunks. It can be that the capacity of a chunk can be reclaimed if and only if all objects referring to the chunks have been deleted or moved to other chunks. Reference counting-based garbage collection can be used to increase reference counts of chunks after object creation, decrease reference counts of chunks after object deletion, and deallocate chunks after chunks' reference count become zero.

FIG. 3 illustrates an example 300 of usage of a B+ tree and a write-ahead-log (WAL) for object data indexing and metadata storage, and that can facilitate incremental reference counting validation based on a copy-on-write indexing structure, in accordance with an embodiment of this disclosure. In some examples, part(s) of example 300 can be implanted by part(s) of system architecture 100 of FIG. 1 to facilitate incremental reference counting validation based on a copy-on-write indexing structure.

Example 300 comprises create object 1 302, write-ahead-log 304, chunk A 306, b+ tree 308, object 1 metadata 310, and incremental reference counting validation based on a copy-on-write indexing structure component 312 (which can be similar to incremental reference counting validation based on a copy-on-write indexing structure component 108 of FIG. 1).

Some storage and database systems can use a B+ tree to index their data. Along with a B+ tree, a write-ahead-log (WAL) can be used for failure recovery. If machines crash during the write process of a B+ tree, the latest B+ tree can be recovered from the WAL. WAL can also be used for failure recovery, and a B+ tree to index object data and store object metadata.

FIG. 4 illustrates an example 400 of parsing a write-ahead-log (WAL) to populate references for reference counting, and that can facilitate incremental reference counting validation based on a copy-on-write indexing structure, in accordance with an embodiment of this disclosure. In some examples, part(s) of example 400 can be implanted by part(s) of system architecture 100 of FIG. 1 to facilitate incremental reference counting validation based on a copy-on-write indexing structure.

Example 400 comprises write-ahead-log 402, increase reference count for chunk 1 404, decrease reference count for chunk 1 406, object 1 data 408, and incremental reference counting validation based on a copy-on-write indexing structure component 410 (which can be similar to incremental reference counting validation based on a copy-on-write indexing structure component 108 of FIG. 1).

Since WAL can involve both operations to objects and metadata of objects, a reference counting build process can also leverage WAL to populate reference counts of chunks incrementally. That is, for every object's CREATE request, reference counts can be increased. And for every object's DELETE request, reference counts can be decreased. After reference counts of chunks become zero, an object storage system can rely on B+ tree to validate if there are any objects that still refer to these chunks before reclaiming them in case the reference counting is wrong. The validation process can iterate the entire B+ tree, and extra object metadata from B+ tree pages, to find out whether chunks to be reclaimed with reference count 0 are still in-used by any objects.

FIG. 5 illustrates an example 500 of validating a reference counting result by iterating a B+ tree and cross-checking against an in-use chunk list in object metadata that is extracted from B+ tree pages, and that can facilitate incremental reference counting validation based on a copy-on-write indexing structure, in accordance with an embodiment of this disclosure. In some examples, part(s) of example 500 can be implanted by part(s) of system architecture 100 of FIG. 1 to facilitate incremental reference counting validation based on a copy-on-write indexing structure.

Example 500 comprises b+ tree with object metadata 502, object metadata 504, object 1 data 506, and incremental reference counting validation based on a copy-on-write indexing structure component 508 (which can be similar to incremental reference counting validation based on a copy-on-write indexing structure component 108 of FIG. 1).

There can be problems with prior approaches to reference counting validation. Performing reference counting validation by iterating the entire B+ tree can become very slow (e.g., take tens of days or several months) on large-scale deployments. More objects can mean more object metadata, larger B+ tree, and more time to iterate B+ tree in every validation process. As a result, chunk garbage collection throughput and storage efficiency can be low. As iterating the entire B+ tree can involve loading contents of all B+ tree pages from disk, this can bring extra IO overhead, and can lead to overall performance degradation.

The present techniques can be implemented to address these problems as follows. There can be an incremental reference validation approach that avoids loading all B+ tree pages while iterating the tree, thus reducing IO overhead, and speeding up the validation process.

It can be that a reference counting validation process can use only an in-use chunk list to validate if chunks with reference count 0 are still in-use, while object metadata contains not only chunk list where its data sits in but also other object information. Hence, it can be that the validation process only needs part of the B+ tree page content (object metadata) for the in-use chunk list. The IO overhead could be reduced by building a separate in-use chunk list and updating it incrementally instead of iterating and loading the entire content of the B+ tree during every validation process.

The number of B+ tree index pages can be relatively small and, in some examples, can be cached in memory, so the IO overhead in prior approaches to validation can be mainly from loading B+ tree leaf pages. In contrast, with the present techniques, for a separate in-use chunk list, it can be kept memory as well as stored on-disk in an index structure (for example, such as another separate B+ tree or skip list) to avoid rebuilding it from scratch each time that the validation process restarts. That is, it can be that, in a worst case after restart, a validation process only needs to load the separate in-use chunk list from disk, which can be relatively light-weighted, and the read IO can be close to a total size of the associated chunk identifiers (IDs).

In contrast to prior approaches, an overall reduction rate of the present techniques in a worst case can be roughly calculated as 100%: "overhead of loading a separate in-use chunk list"/"overhead of loading all btree leaf pages to extract the in-use chunk list." When a B+ tree page contains j objects' metadata and the object's metadata refers to k chunks, the reduction rate can be 100%: $j*k*chunk$ ID size/B+ tree page size. In a scenario where a B+ tree page size is 4 kilobytes (KiB), a page can contain 4 objects' metadata (1 KiB per object), an object's metadata can refer to 2 chunks, and the chunk ID size can be 16 bytes (B), the rate is 100%, or $4*2*16B/4$ KiB=96.875% in a worse case. Since IO overhead from a B+ tree page read can be the main bottleneck of a validation process, by reducing the IO during reference validation process, the validation process itself can be sped up, and garbage collection throughput can also be increased.

Figure 6:
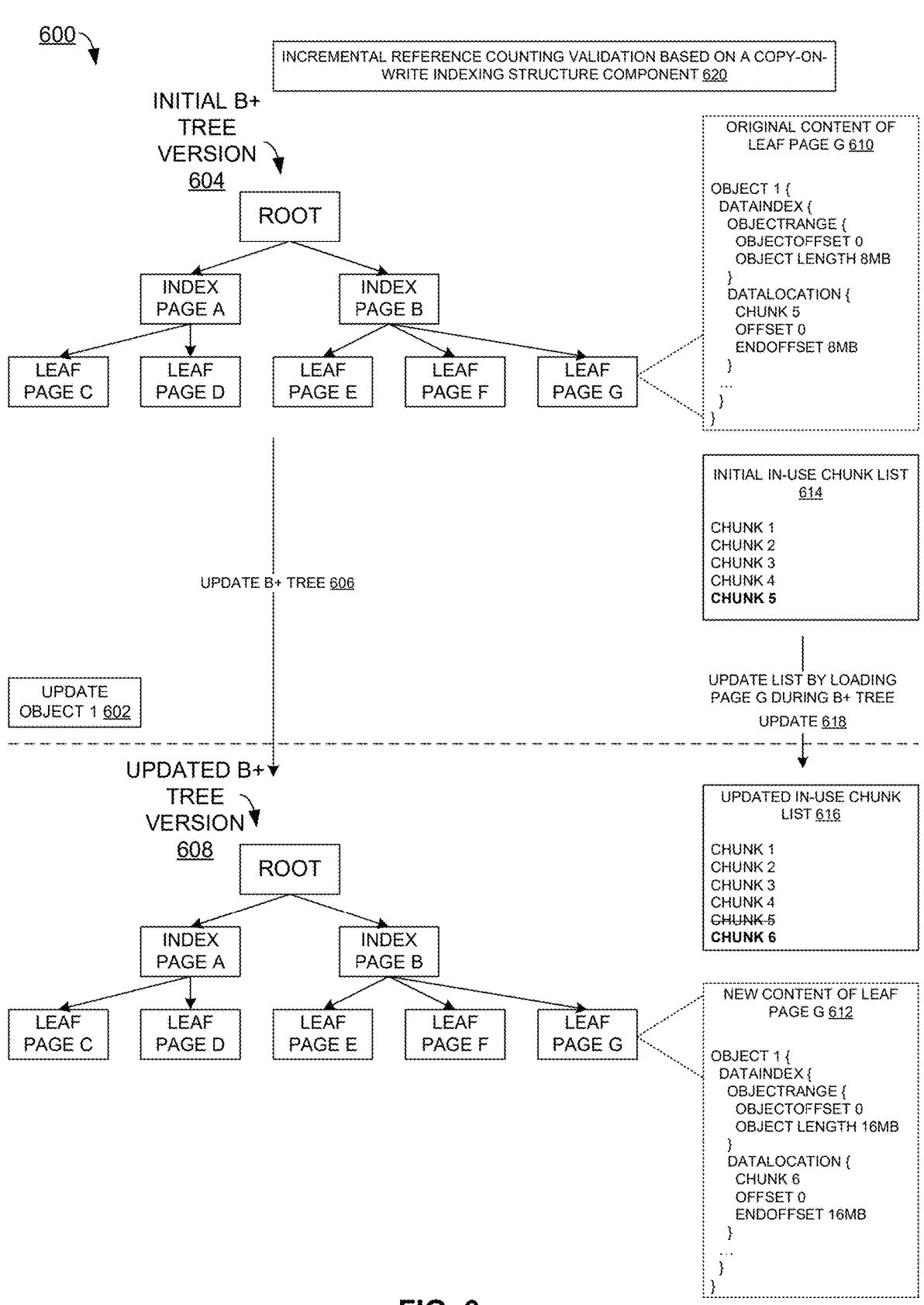
FIG. 6 illustrates an example of synchronously updating an in-use chunk list along with updating a b-tree update, in accordance with an embodiment of this disclosure.

FIG. 6 illustrates an example 600 of synchronously updating an in-use chunk list along with updating a b-tree update, in accordance with an embodiment of this disclosure. In some examples, part(s) of example 600 can be implanted by part(s) of system architecture 100 of FIG. 1 to facilitate incremental reference counting validation based on a copy-on-write indexing structure.

Example 600 comprises update object 1 602, initial b+ tree version 604, update b+ tree 606, updated b+ tree version 608, original content of leaf page G 610, new content of leaf page G 612, initial in-use chunk list 614, updated in-use chunk list 616, update list by loading page G during b+ tree update 618, and incremental reference counting validation based on a copy-on-write indexing structure component 620 (which can be similar to incremental reference counting validation based on a copy-on-write indexing structure component 108 of FIG. 1).

An initial in-use chunk list can be built during a first round of a validation process by persisting an in-use chunk list extracted from object metadata in B+ tree pages. The present techniques can then address how to incrementally update the chunk list to speed up following rounds of the validation processes without a performance impact on the critical path. In prior approaches, B+ tree page content can be updated in place, so it can be that the difference of object metadata or the difference of in-use chunk lists between different B+ tree versions cannot be detected directly without loading the B+ tree page content. Hence, in prior approaches, it can be that the only incremental way to update the in-use chunk list is updating it while updating the B+ tree page content. However, this approach can have a negative impact on the performance as B+ tree update is in the critical path of object storage.

FIG. 7 illustrates an example 700 of a copy-on-write (CoW) B+ tree that can facilitate incremental reference counting validation based on a copy-on-write indexing structure, in accordance with an embodiment of this disclosure. In some examples, part(s) of example 700 can be implanted by part(s) of system architecture 100 of FIG. 1 to facilitate incremental reference counting validation based on a copy-on-write indexing structure.

Example 700 comprises B+ tree 702, update content in leaf page G 704, B+ tree 706, and incremental reference counting validation based on a copy-on-write indexing structure component 708 (which can be similar to incremental reference counting validation based on a copy-on-write indexing structure component 108 of FIG. 1).

It can be that writes of a copy-on-write (CoW) B+ tree indexing structure do not overwrite a B+ tree page in place. Instead, a modified copy of the page with a different page ID can be created and written to a new location, and its parent index page can be updated to point to the new location. As a result, if a B+ tree page ID is not changed, it can be that its content (object metadata) is not changed, nor are the chunks (object data) which object metadata refers to.

Figure 8:
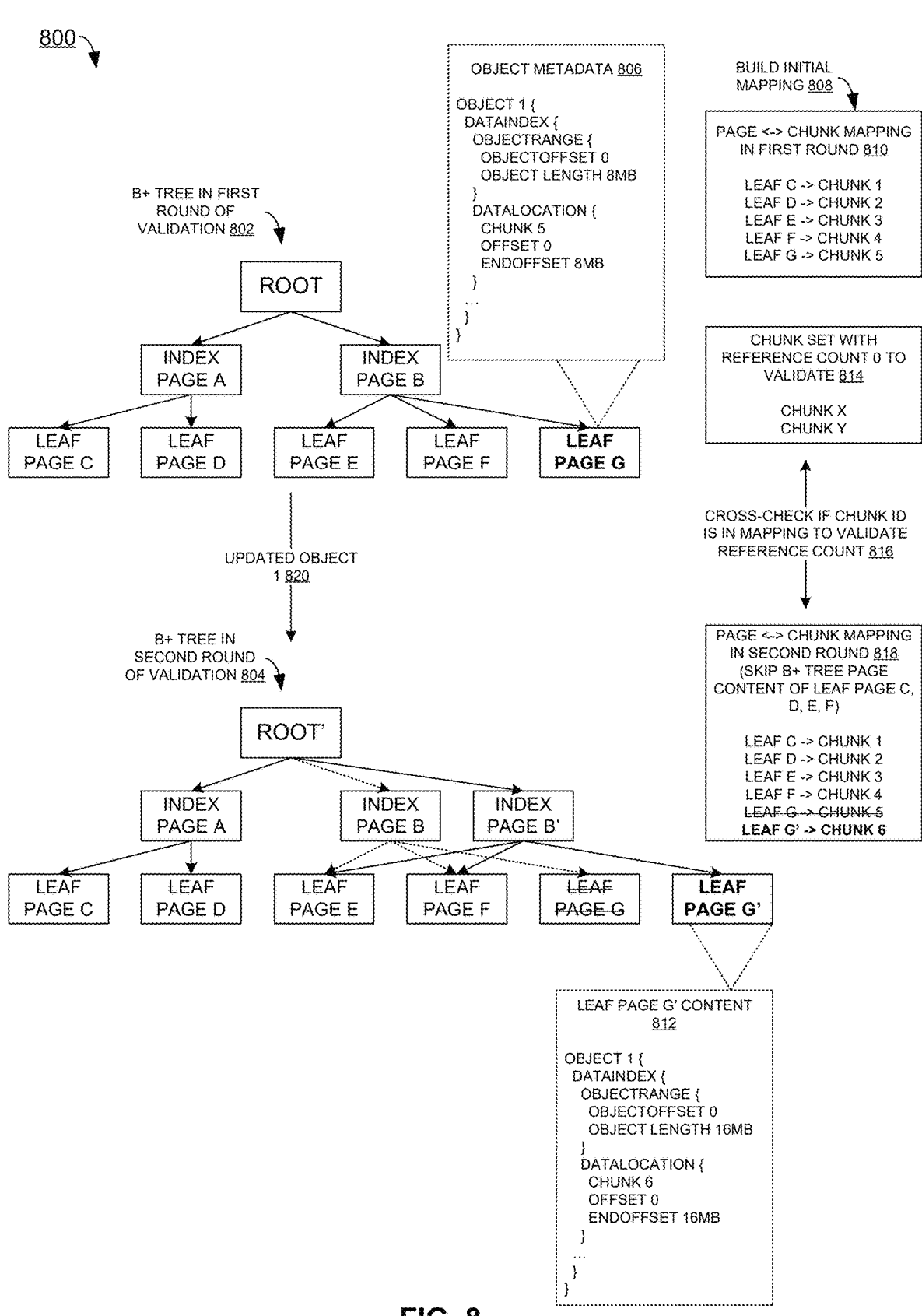
FIG. 8 illustrates an example of incremental reference count validation based on a copy-on-write (CW) B+ tree, and that can facilitate incremental reference counting validation based on a copy-on-write indexing structure, in accordance with an embodiment of this disclosure.

FIG. 8 illustrates an example 800 of incremental reference count validation based on a copy-on-write (CoW) B+ tree, and that can facilitate incremental reference counting validation based on a copy-on-write indexing structure, in accordance with an embodiment of this disclosure. In some examples, part(s) of example 800 can be implanted by part(s) of system architecture 100 of FIG. 1 to facilitate incremental reference counting validation based on a copy-on-write indexing structure.

Example 800 comprises B+ tree in first round of validation 802, B+ tree in second round of validation 804, object metadata 806, build initial mapping 808, page <-> chunk mapping in first round 810, leaf page G' content 812, chunk set with reference count 0 to validate 814, cross-check if chunk ID is in mapping to validate reference count 816, page <-> chunk mapping in second round 818 (skip B+ tree page content of leaf page C, D, E, and F), and updated object 1 820.

With the help of the characteristics of a CoW B+ tree indexing structure, changes to the B+ tree can be identified by B+ tree page ID. A mapping can be built between B+ tree page IDs and in-use chunk IDs for the validation process. When iterating the B+ tree for validation, if the B+ tree page ID is in the mapping, in-use chunk IDs can be loaded directly from the mapping; otherwise, page content can be loaded on demand to extract the in-use chunk list from object metadata and update the mapping incrementally. An incremental update of the mapping can occur during the validation process instead of the B+ tree update process, which is not in the critical path of object storage. Hence, it can be that updating the mapping does not have a negative performance impact.

In a large-scale storage system, it can be that only a small portion of user data will be changed, so only a small portion the indexing structure of the user data is changed. As a result, it can be that only a small portion of the B+ tree page IDs and in-use chunk IDs mapping will be outdated and need to be updated by loading B+ tree page content because their page IDs are not in the mapping.

Consider an example where the sizes of chunk ID and B+ tree page ID are both 16 bytes, the average indexing overhead for a page ID in the mapping structure is 2x, while the page size is usually 4 KiB. A B+ tree can contain m B+ tree pages, a B+ tree page can contain 4 objects' metadata and the object's metadata can refer to 2 chunks and object deletion or new object creation, leading to x % of the entire B+ tree changed between the first and the second round of a validation processes.

It can be that first round of a validation process does not have any mapping information and it needs to build the initial mapping, so $x_1 = 100\%$ and its IO overhead $y_1$ is (4 KiB+16*2 bytes+16*4*2 bytes)*m. The overall IO overhead of subsequence validation process can be determined as:

IO overhead of updating outdated B+ tree page and in-use chunk mapping is:

$$(16*2 \text{ bytes} + 16*4*2 \text{ bytes})*m*x \ \% \ (0 <= x \ \% \ <= 100\%,$$
$$\text{percentage of } B+ \text{ tree pages changed in the entire } B+ \text{ tree})$$

IO overhead of loading B+ tree pages is:

$$4 \text{ KiB}*m*x \ \% \ (0 <= x \ \% \ <= 100\%)$$

Overall IO overhead y is the sum of the above:

$$y = (16*2 \text{ bytes} + 16*4*2 \text{ bytes})*n*x \ \% \ +4 \text{ KiB}*n*x \ \% \ =$$
$$4256 \text{ bytes})*m*x \ \%, \ (0 <= x \ \% \ <= 100\%)$$

To have the benefit, $y <= y_{original}$ (original IO overhead without improvement), 4256 bytes*m*x %=4 KiB*m, so x %<=96.24%. This can be true in a large cluster where only a small portion of data will be changed.

As a time of validation process can be almost proportional to the IO overhead, it can be that the smaller the overall IO overhead is, the less time is used for a validation process, and the less B+ tree content changes are in a next round of validation process. They can be calculated as:

Percentage of B+ tree pages changed in the entire B+ tree between n and n−1 round of validation process:

$$x_n \ \% = t_{n-1} \ / t_{original} * x_{original} \ \% \sim = y_{n-1} \ / y_{original} * x_{original} \ \%$$

IO overhead of the n round validation process:

$$y_n = 4256 \text{ bytes}*m*x_n \ \% =$$
$$4256 \text{ bytes}*m*y_{n-1} / y_{original}*x_{original} \ \% = 4256 \text{ bytes}*$$
$$m / (4 \text{ KiB}*m)*y_{n-1}*x_{original} \ \% = 1.0390625*y_{n-1}*x_{original} \ \%$$

Time of the n round validation process $$t_n \sim =$$
$$y_n / y_{original}*t_{original} = 1.0390625*y_{n-1}*x_{original} \ \% / y_{original}*t_{original},$$

where $y_{original}$ is the original IO overhead and $t_{original}$ is the original time duration before the improvement.

It can be that both IO overhead $y_n$ and time $t_n$ of a validation process are reduced through implementing the present techniques, because $x_{original}$ can be small on a large-scale system. Further assuming that the value of $x_{original}$ is 10% as an example, the IO overhead of a second round of validation process $y_2$ is:

$$y_2 = 1.0390625 * y_1 * x_{original} \% =$$
$$1.0390625 * 4256 \text{ bytes} * m * 10\% = 442.225 \text{ bytes} * m$$

and the time duration of $2^{nd}$ round of validation process is:

$$t_2 \sim = y_2 / y_{original} * t_{original} =$$
$$442.225 \text{ bytes} * m / (4 \text{ KiB} * m) * t_{original} = 10.80\% * t_{original}$$

IO overhead and time duration of third round of validation process can be further reduced to:

$$y_3 = 1.0390625 * y_2 * x_{original} \% =$$
$$1.0390625 * 442.225 \text{ bytes} * m * 10\% = 45.95 \text{ bytes} * m$$
$$t_3 \sim = 1.0390625 * y_{n-1} * x_{original} \% / y_{original} * t_{original} = 1.0390625 *$$
$$(442.225 \text{ bytes} * m) * 10\% / (4 \text{ KiB} * m) * t_{original} = 1.12\% * t_{original}$$

This is reduced to about 1% in the 3rd round, and can be close to 0 in the following rounds.

With prior approaches, a chunk reference counting validation process can need to loading contents of the entire B+ tree which is very slow on large-scale deployments. As a result, the chunk garbage collection throughput and storage efficiency can be low. As loading and extracting contents from B+ tree pages can bring extra IO/CPU overhead, it can also lead to overall performance degradation.

With the present techniques of an incremental reference counting validation approach, it can be that:

Only a small portion of B+ tree content needs to be loaded from disk for a reference counting validation process. The present techniques can greatly reduce IO overhead of the validation process to about 1% after a few rounds in, even including the update of an additional mapping structure introduced for the present techniques.

The incremental reference counting validation process can be approximately 100× times faster after a few rounds, so a garbage collection speed that relies on a speed of a validation process can also be much faster. Storage efficiency can increase as well, because garbage collection performance is better.

A system with less B+ tree IO overhead and less CPU overhead caused by the B+ tree IO and B+ tree page content extraction can have better overall performance.

The present techniques can be applied to performance-sensitive storage system, as it can be that they do not have negative impact to the critical path.

The present techniques can also be applied similarly to storage systems with other CoW indexing structures.

Example Process Flows

FIG. 9 illustrates an example process flow 900 for incremental reference counting validation based on a copy-on-write indexing structure, in accordance with an embodiment of this disclosure. In some examples, one or more embodiments of process flow 900 can be implemented by system architecture 100 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 500 of FIG. 5, process flow 1000 of FIG. 10, and/or process flow 1100 of FIG. 11.

Process flow 900 begins with 902, and moves to operation 904.

Operation 904 depicts maintaining a copy-on-write B+ tree for a data storage system that is configured to store data as chunks. This can be similar to as depicted in system architecture 100 of FIG. 1.

In some examples, respective chunks of the chunks comprise at least one data block of the data storage system. That is, a chunk can be made up of one or more data blocks stored on disk.

After operation 904, process flow 900 moves to operation 906.

Operation 906 depicts maintaining a mapping between tree page identifiers of the B+ tree and first in-use chunk identifiers, of the data storage system, which are used to store data. Using the example of FIG. 8, this mapping can be similar to page <-> chunk mapping in first round 810 and/or page <-> chunk mapping in second round 818.

In some examples the reference count validation (of operation 908) is a first reference count validation, and operation 906 comprises, as part of performing an initial reference count validation, wherein the mapping does not exist at a time the initial reference count validation is initiated, building the mapping.

In some examples, this comprises independently of determining whether a second tree page identifier of the tree page identifiers is present in the mapping and after performing the building of the mapping, performing the initial reference count validation based on the mapping to produce an initial validation result, and performing garbage collection of the data storage system based on the initial validation result. That is, a mapping can be initially built where one does not already exist.

After operation 906, process flow 900 moves to operation 908.

Operation 908 depicts performing a reference count validation, comprising iterating over the mapping, to produce a validation result, wherein the iterating over the mapping comprises, based on a first tree page identifier of the tree page identifiers being present in the mapping, loading second in-use chunk identifiers that correspond to the first tree page identifier directly from the mapping; and based on the first tree page identifier of the tree page identifiers being absent from the mapping, loading content that corresponds to the first tree page identifier, extracting third in-use chunk identifiers from object metadata of the content, and updating the mapping based on the third in-use chunk identifiers, to produce an updated mapping. This iterative updating of the mapping can be performed in a similar manner as described with respect to FIG. 8.

In some examples, updating the copy-on-write B+ tree is performed independently of updating the mapping. In some examples, updating the mapping is performed independently of updating the copy-on-write B+ tree. That is, an incremental update of the mapping can occur during the validation process instead of the B+ tree update process, so updating the mapping can occur outside of a critical path of object storage.

In some examples, performing the reference count validation comprises determining whether respective reference counts of numbers of files or objects that point to respective chunks of the chunks are correct.

After operation 908, process flow 900 moves to operation 910.

Operation 910 depicts performing garbage collection of the data storage system based on the validation result. That is, after reference count validation is performed operation 908, this information can be used to perform garbage collection to delete data chunks that are not pointed to by any data objects.

In some examples, performing the garbage collection on a first group of chunks of the chunks for which the validation result indicates that respective first chunks of the first group of chunks have respective reference counts of zero. That is, garbage collection can be performed on data chunks that are not pointed to (or referenced) by a data object.

After operation 910, process flow 900 moves to 912, where process flow 900 ends.

FIG. 10 illustrates an example process flow 1000 for incremental reference counting validation based on a copy-on-write indexing structure, in accordance with an embodiment of this disclosure. In some examples, one or more embodiments of process flow 1000 can be implemented by system architecture 100 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 500 of FIG. 5, process flow 900 of FIG. 9, and/or process flow 1100 of FIG. 11.

Process flow 1000 begins with 1002, and moves to operation 1004.

Operation 1004 depicts maintaining a mapping between tree page identifiers of a copy-on-write B+ tree and first in-use chunk identifiers of a storage system that are used to store data. In some examples, operation 1004 can be implemented in a similar manner as operations 904-906 of FIG. 9.

In some examples, the copy-on-write B+ tree is maintained by creating a modified copy of a B+ tree page of the copy-on-write B+ tree, wherein the modified copy of a B+ tree page comprises a first page identifier, and wherein the B+ tree page comprises a second page identifier, writing the modified copy of the B+ tree page to a different location than where the B+ tree page is stored, and updating a parent index page that corresponds to the modified copy of the B+ tree page to point to the different location. That is, It can be that writes of COW B+ tree indexing structure do not overwrite a B+ tree page in place. Instead, a modified copy of the page with a different page ID can be created and written to a new location, and its parent index page can be updated to point to the new location. As a result, if a B+ tree page ID is not changed, it can be that its content (object metadata) is not changed, nor are the chunks (object data) which object metadata refers to.

After operation 1004, process flow 1000 moves to operation 1006.

Operation 1006 depicts performing a reference count validation, comprising iterating over the mapping, to produce a validation result, wherein the iterating over the mapping comprises, based on a first tree page identifier of the tree page identifiers being present in the mapping, loading, by the system and from the mapping, second in-use chunk identifiers that correspond to the first tree page identifier; and based on the first tree page identifier being omitted from the mapping, loading content that corresponds to the first tree page identifier, updating the mapping based on third in-use chunk identifiers from object metadata of the content that corresponds to the first tree page identifier, to produce an updated mapping. In some examples, operation 1006 can be implemented in a similar manner as operation 908 of FIG. 9.

In some examples, the reference count validation is a first reference count validation, and operation 1006 comprises building the mapping as part of performing an initial reference count validation, wherein the mapping does not exist at a time the initial reference count validation is initiated. In some examples, operation 1006 comprises performing the initial reference count validation to produce an initial validation result based on the mapping, and after performing the building of the mapping, independently of determining whether a second tree page identifier of the tree page identifiers is present in the mapping, and performing garbage collection of the storage system based on the initial validation result.

In some examples, performing the reference count validation is associated with using a first amount of computing resources, performing the initial reference count validation is associated with using a second amount of computing resources, and the first amount of computing resources is less than the second amount of computing resources. That is, incremental reference counting can involve a lower loan on a computer compared with performing an entire non-incremental reference counting.

In some examples, performing the reference count validation is associated with occurring during a first time period, wherein performing the initial reference count validation is associated with during a second time period, and wherein the first time period is shorter than the second time period. That is, incremental reference counting can be performed faster compared with performing an entire non-incremental reference counting.

After operation 1006, process flow 1000 moves to operation 1008.

Operation 1008 depicts performing garbage collection of the storage system based on the validation result. In some examples, operation 1008 can be implemented in a similar manner as operation 910 of FIG. 9.

After operation 1008, process flow 1000 moves to 1010, where process flow 1000 ends.

FIG. 11 illustrates an example process flow 1100 for incremental reference counting validation based on a copy-on-write indexing structure, in accordance with an embodiment of this disclosure. In some examples, one or more embodiments of process flow 1100 can be implemented by system architecture 100 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 500 of FIG. 5, process flow 900 of FIG. 9, and/or process flow 1000 of FIG. 10.

Process flow 1100 begins with 1102, and moves to operation 1104.

Operation 1104 depicts performing a reference count validation, comprising iterating over a mapping between tree page identifiers of a copy-on-write B+ tree and first in-use chunk identifiers of a storage system that are used to store data, to produce a validation result, wherein the iterating over the mapping comprises, based on a first tree page identifier of the tree page identifiers being present in the mapping, loading, by the system and from the mapping, second in-use chunk identifiers that correspond to the first tree page identifier; and based on the first tree page identifier being omitted from the mapping, loading content that corresponds to the first tree page identifier, updating the mapping based on third in-use chunk identifiers from object metadata of the content that corresponds to the first tree page identifier, to produce an updated mapping. In some examples, operation 1104 can be implemented in a similar manner as operations 904-908 of FIG. 9.

In some examples, the reference count validation is a first reference count validation, and operation 1104 comprises building the mapping as part of performing an initial reference count validation. In some examples, operation 1106 comprises performing the initial reference count validation based on the mapping, and after performing the building of the mapping, independently of determining whether a second tree page identifier of the tree page identifiers is present in the mapping, to produce an initial validation result, and performing garbage collection of the storage system based on the initial validation result.

In some examples, operation 1104 comprises performing iterations of performing the reference count validation, wherein the respective iterations comprise incrementally updating the mapping. That is, reference count validation (and corresponding garbage collection) can be an ongoing process, where the mapping is incrementally updated as part of performing repeated reference count validation.

In some examples, the producing of the updated mapping occurs outside of a critical path of data storage on the storage system. That is, the present techniques can be implemented on a performance-sensitive storage system where the present techniques do not negatively impact a critical path of data storage.

In some examples, the performing of the reference count validation comprises refraining from accessing at least one tree page of the copy-on-write B+ tree. That is, an incremental reference validation approach according to the present techniques can involve avoiding loading all B+ trees while iterating a B+ tree, thus reducing I/O overhead and speeding a reference validation process compared to other techniques.

After operation 1104, process flow 1100 moves to operation 1106.

Operation 1106 depicts performing garbage collection of the storage system based on the validation result. In some examples, operation 1106 can be implemented in a similar manner as operation 910 of FIG. 9.

After operation 1106, process flow 1100 moves to 1108, where process flow 1100 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of computer storage system 102 and/or remote computer 106 of FIG. 1.

In some examples, computing environment 1200 can implement one or more embodiments of the process flows of FIGS. 9-11 to facilitate incremental reference counting validation based on a copy-on-write indexing structure.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples, and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1216 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/ output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/ communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory that stores executable instructions that, when executed by the at least one processor, facilitate performance of operations, comprising:
maintaining a copy-on-write b+ tree for a data storage system that is configured to store data as chunks;
maintaining a mapping between tree page identifiers of the b+ tree and first in-use chunk identifiers, of the data storage system, that are used to store data;
performing a reference count validation, comprising iterating over the mapping, to produce a validation result, wherein the validation result indicates whether respective chunks of the chunks are suitable for garbage collection because they are not pointed to by a data object, and wherein the iterating over the mapping comprises, for respective tree page identifiers of the tree page identifiers,
based on a first tree page identifier of the tree page identifiers being present in the mapping,
loading second in-use chunk identifiers that correspond to the first tree page identifier directly from the mapping, and
updating the validation result based on the loading of the second in-use chunk identifiers, and
based on the first tree page identifier of the tree page identifiers being absent from the mapping,
loading content that corresponds to the first tree page identifier,
extracting third in-use chunk identifiers from object metadata of the content,
updating the validation result based on the extracting of the third in-use chunk identifiers, and
updating the mapping based on the third in-use chunk identifiers, to produce an updated mapping; and
performing garbage collection of the data storage system based on the validation result.

2. The system of claim 1, wherein the reference count validation is a first reference count validation, and wherein the operations further comprise:
as part of performing an initial reference count validation, wherein the mapping does not exist at a time the initial reference count validation is initiated, building the mapping.

3. The system of claim 2, wherein the operations further comprise:
independently of determining whether a second tree page identifier of the tree page identifiers is present in the mapping and after performing the building of the mapping, performing the initial reference count validation based on the mapping to produce an initial validation result; and
performing garbage collection of the data storage system based on the initial validation result.

4. The system of claim 1, wherein updating the copy-on-write b+ tree is performed independently of updating the mapping.

5. The system of claim 1, wherein updating the mapping is performed independently of updating the copy-on-write b+ tree.

6. The system of claim 1, wherein performing the garbage collection on a first group of chunks of the chunks for which the validation result indicates that respective first chunks of the first group of chunks have respective reference counts of zero.

7. The system of claim 1, wherein performing the reference count validation comprises:
   determining whether respective reference counts of numbers of files or objects that point to respective chunks of the chunks are correct.

8. The system of claim 1, wherein respective chunks of the chunks comprise at least one data block of the data storage system.

9. A method, comprising:
   maintaining, by a system comprising at least one processor, a mapping between tree page identifiers of a copy-on-write b+ tree and first in-use chunk identifiers of a storage system that are used to store data;
   performing, by the system, a reference count validation, comprising iterating over the mapping, to produce a validation result, wherein the validation result indicates whether respective chunks that correspond to the first in-use chunk identifiers are suitable for garbage collection because they are not pointed to by a data object, and wherein the iterating over the mapping comprises, for respective tree page identifiers of the tree page identifiers,
   based on a first tree page identifier of the tree page identifiers being present in the mapping,
      loading, by the system and from the mapping, second in-use chunk identifiers that correspond to the first tree page identifier, and
      updating, by the system, the validation result based on the loading of the second in-use chunk identifiers, and
   based on the first tree page identifier being omitted from the mapping,
      loading, by the system, content that corresponds to the first tree page identifier,
      updating, by the system, the validation result based on the extracting of the third in-use chunk identifiers, and
      updating, by the system, the mapping based on third in-use chunk identifiers from object metadata of the content that corresponds to the first tree page identifier, to produce an updated mapping; and
   performing, by the system, garbage collection of the storage system based on the validation result.

10. The method of claim 9, wherein the reference count validation is a first reference count validation, and further comprising:
   building, by the system, the mapping as part of performing an initial reference count validation, wherein the mapping does not exist at a time the initial reference count validation is initiated.

11. The method of claim 10, further comprising:
   performing, by the system, the initial reference count validation to produce an initial validation result based on the mapping, and after performing the building of the mapping, independently of determining whether a second tree page identifier of the tree page identifiers is present in the mapping; and
   performing, by the system, garbage collection of the storage system based on the initial validation result.

12. The method of claim 10, wherein performing the reference count validation is associated with using a first amount of computing resources, wherein performing the initial reference count validation is associated with using a second amount of computing resources, and wherein the first amount of computing resources is less than the second amount of computing resources.

13. The method of claim 10, wherein performing the reference count validation is associated with occurring during a first time period, wherein performing the initial reference count validation is associated with during a second time period, and wherein the first time period is shorter than the second time period.

14. The method of claim 9, wherein the copy-on-write b+ tree is maintained by,
   creating a modified copy of a b+ tree page of the copy-on-write b+ tree, wherein the modified copy of a b+ tree page comprises a first page identifier, and wherein the b+ tree page comprises a second page identifier,
   writing the modified copy of the b+ tree page to a different location than where the b+ tree page is stored, and
   updating a parent index page that corresponds to the modified copy of the b+ tree page to point to the different location.

15. A non-transitory computer-readable medium comprising instructions that, in response to execution, cause a system comprising at least one processor to perform operations, comprising:
   performing a reference count validation, comprising iterating over a mapping between tree page identifiers of a copy-on-write b+ tree and first in-use chunk identifiers of a storage system that are used to store data, to produce a validation result, wherein the validation result indicates whether respective chunks that correspond to the first in-use chunk identifiers are suitable for garbage collection because they are not pointed to by a data object, and wherein the iterating over the mapping comprises, for respective tree page identifiers of the tree page identifiers,
   based on a first tree page identifier of the tree page identifiers being present in the mapping,
      loading, by the system and from the mapping, second in-use chunk identifiers that correspond to the first tree page identifier, and
      updating the validation result based on the loading of the second in-use chunk identifiers, and
   based on the first tree page identifier being omitted from the mapping,
      loading content that corresponds to the first tree page identifier,
      updating the validation result based on the extracting of the third in-use chunk identifiers, and
      updating the mapping based on third in-use chunk identifiers from object metadata of the content that corresponds to the first tree page identifier, to produce an updated mapping; and
   performing garbage collection of the storage system based on the validation result.

16. The non-transitory computer-readable medium of claim 15, wherein the reference count validation is a first reference count validation, and wherein the operations further comprise:
   building the mapping as part of performing an initial reference count validation.

17. The non-transitory computer-readable medium of claim 16, wherein the operations further comprise:
   performing, by the system, the initial reference count validation based on the mapping, and after performing the building of the mapping, independently of determining whether a second tree page identifier of the tree page identifiers is present in the mapping, to produce an initial validation result; and performing, by the system, garbage collection of the storage system based on the initial validation result.

18. The non-transitory computer-readable medium of claim 15, wherein the operations further comprise:

performing iterations of performing the reference count validation, wherein the respective iterations comprise incrementally updating the mapping.

19. The non-transitory computer-readable medium of claim 15, wherein the producing of the updated mapping occurs outside of a critical path of data storage on the storage system.

20. The non-transitory computer-readable medium of claim 15, wherein the performing of the reference count validation comprises refraining from accessing at least one tree page of the copy-on-write b+ tree.

\* \* \* \* \*